2,874,037

PROCESS FOR STABILIZING PYROPHORIC IRON

Earl E. Fisher, Glenolden, Pa., assignor to Gulf Oil Corporation, Pittsburgh, Pa., a corporation of Pennsylvania No Drawing. Application December 18, 1957
Serial No. 703,492

8 Claims. (Cl. 75—34)

This invention relates to stabilization of metallic iron that has been prepared by direct reduction of finely divided iron ore.

According to the principles of the presently known processes for direct reduction of iron ore, metallic iron is prepared by subjecting a fluidized bed of finely divided particles of relatively high grade iron ore, consisting principally of iron oxide and relatively free of silicon, manganese and other so-called inerts, to reduction with a reducing gas, ordinarily hydrogen. After reduction, the freshly reduced metallic iron particles are normally compacted into briquettes or sheets of substantial thickness in order to facilitate handling and in order to improve the stability of the freshly reduced iron. When the directly reduced particles are compacted in sheet form, the sheets are ordinarily broken into pieces about 2 to 3 inches in diameter and having a thickness corresponding to that of the sheet, normally about ¼ inch. The pieces of broken iron sheet, commonly referred to in the industry as "chips," resemble sintered metal in appearance. The compacted iron chips are then stored for future use as a portion of the charge to an open hearth steel furnace.

The freshly reduced iron chips or briquettes are extremely active chemically and highly susceptible to oxidation, in fact pyrophoric, because of their large surface area. By way of illustrating the instability of freshly reduced iron, it may be noted that powdered, freshly reduced iron will burst into flame spontaneously when scattered in the air. Although chips or briquettes formed from freshly reduced iron are considerably more stable than powdered, freshly reduced iron, a temperature rise of more than 1200° F., due to spontaneous oxidation, has been observed to occur within 48 hours in a container of reduced iron chips through which air was allowed to circulate. Since it is not practical to charge reduced iron to open hearth furnaces as rapidly as it is produced, a substantial problem exists with regard to stabilization of the iron during storage. It has previously been proposed to stabilize compacted reduced iron by direct immersion in certain mineral oils maintained at temperatures of 80° to 150° F. Unfortunately, although this method of stabilizing is satisfactory on a laboratory scale insofar as the stability of the iron is concerned, the method is not practical, since when practiced on a commercial scale a serious problem of dissipation of heat is involved because of the large quantities of iron involved. Sludging of the oil, due to decomposition, also takes place. In order to alleviate these problems it has been proposed partially to precool the hot, compacted reduced iron prior to immersion in oil, for example by means of a water spray or by immersion in boiling water. However, it has been found that immersion of the precooled, compacted reduced iron in an oil bath maintained at 80° to 150° F. is not effective to stabilize the precooled iron, even though the same mineral oil at the same temperature is effective when the reduced iron is directly immersed therein. Of 16 oils found effective at temperatures of 80° to 150° F. to stabilize reduced iron by direct immersion therein, not one was found satisfactory at the identical temperature conditions for use in stabilizing precooled reduced iron.

The present invention relates to a method of stabilizing precooled, compacted reduced iron whereby the compacted reduced iron can be stored for substantial periods without significant oxidation and without a hazardous increase in temperature. It has now been found that freshly reduced iron can be stabilized by precooling the iron to a temperature in the range of about 210° to 400° F. and by then immersing the precooled iron in a stabilizing bath of a relatively high boiling hydrocarbon oil that is at a temperature not greater than about 400° F., preferably 250° to 350° F., but at least sufficient to reduce the surface tension of the oil to a value not more than about 34 dynes per centimeter and such that 250 grams of the thus stabilized iron in boiling water will not evolve more than 0.5 milliliters of hydrogen per second. Reduced iron of exceptional stability is obtained when the surface tension of the oil is in the range of about 23 to 30 dynes per centimeter at the temperature of the bath.

Examples of oils suitable for use in the present invention include a wide variety of relatively high boiling oils, that is, oils having an initial boiling point above about 550° F., preferably above 650° F., at atmospheric pressure (760 mm. Hg), such as lubricating distillates, bright stocks, heavy gas oil distillates, the furfural, cresylic acid or phenol extracts or other solvent extracts obtained from lubricating oil distillates, atmospheric and vacuum tower bottoms, that is, the distillation bottoms obtained during distillation of crude petroleum oil respectively at atmospheric pressures and under reduced pressure, reduced crude oil, black oils (residual lubricating oils) including winter, summer and low temperature grades, white oils, residual fuel oils, asphaltum oils, and other similar, relatively heavy oils that possess a surface tension of less than 34 dynes per centimeter at a temperature in the range of about 250° to 400° F. Although mineral hydrocarbon oils including paraffinic type and naphthenic or aromatic type oils derived from a variety of crude oils, e. g., Coastal, mixed-base, Middle Eastern and Venezuela crude oils, have been found to be useful for the purposes of the present invention, especially good results are obtained by the use of oils that are neither extremely paraffinic nor extremely aromatic or naphthenic. Such oils are characterized by a viscosity-gravity content in the range of about 0.865 to about 0.910. Nevertheless, oils having viscosity-gravity constants up to about 0.945 have been found operative. Other characteristics of preferred stabilizing oils include an API gravity in the range of about 15 to 25 and a viscosity in the range of about 10 to 450 Saybolt Universal seconds at the minimum preferred temperature of the bath, i. e., 250° F. However, oils having properties well outside these ranges, for example, viscosities of as low as about 1.90 and up to about 2000 S. U. S. at 250° F. and gravities of as low as about 7.5° API have been found to produce substantial benefits.

Other factors that may enter into the selection of an optimum stabilizing oil include flash point and sulfur content. In the interest of safety, it is preferred that the stabilizing oil have a flash point above the temperature at which the stabilizing bath is maintained. However, this is not absolutely essential provided suitable precautionary measures, i. e., exclusion of air, are taken. Also, inasmuch as sulfur is an undesirable constituent in steel, it is desirable that the stabilizing oil have a sulfur content not more than about 3 percent by weight, although this is not essential insofar as the stability of the reduced iron is concerned. Preferably the sulfur content of the stabilizing oil will be not greater than 1 percent. Oils having a sulfur content of greater than 3 percent and otherwise qualifying as satisfactory stabilizing oils can be employed in the present process with good results after blending with suitable low sulfur oils in a proportion such as to form oils having a sulfur content of 3 percent or less.

The manner in which the above-described procedure functions to stabilize the precooled reduced iron is not fully understood. Accordingly, the present invention is not limited to any particular theory of operation. While it might appear that the stability of the reduced iron merely increases in proportion to the reduced surface tension of the stabilizing oil, this is more or less negatived by the fact that oils that have been found satisfactory to stabilize precooled, freshly reduced iron at initial temperatures of 250° F. (max. 300° F.) to 350° F. (max. 350° F.), but not at an initial temperature of 80° F. (max. 150° F.), have been found effective to stabilize compacted iron by direct immersion (without precooling) in oils at an initial temperature of 80° F. (max. 150° F.), notwithstanding that such oils possessed substantially higher surface tensions at the lower temperatures. This fact is interpreted to indicate that the mechanism of stabilization with oil is different when the reduced iron is immersed directly in the oil than when the reduced iron is first precooled and then immersed in the oil. It may be that precooling of the compacted reduced iron prevents a chemical change in the oil, e. g., decomposition to produce hydrogen or other reducing gas, that takes place when the iron is directly immersed in the oil. This could explain why the surface tension of the oil is important in the stabilization of the precooled iron, whereas the surface tension of the oil is relatively unimportant when the reduced iron is stabilized by direct immersion in the oil bath.

Referring again to the reduction of the iron ore, reduction is carried out at an elevated temperature below the fusion temperature of either metallic iron or the iron ore, and at an elevated pressure that varies inversely with the reduction temperature. Thus, when ores of very high purity are charged to the process, reduction temperatures of about 1000° to 1700° F., for example, 1200° F., 1400° F., and relatively low hydrogen pressures in the range of about 50 and 250 p. s. i., for example, 100 p. s. i., can be used without difficulty. When using less pure ores the hydrogen reduction is preferably effected at higher hydrogen pressures in the range of about 350 to 500 p. s. i., for example 400 p. s. i., and at temperatures in the range of about 800° to 1000° F., for example 900° F. In either case an excess of hydrogen is employed in the reaction and unreacted hydrogen is purified and recycled to the reduction reaction. Hydrogen suitable for the process is generated in any convenient manner. For example, a mixture of hydrogen and carbon monoxide can be produced by partial combustion of fuel oil or by steam-methane reforming. This mixture can then be reacted with steam to form a hydrogen-carbon dioxide mixture and carbon dioxide and moisture can be separated out to produce essentially pure hydrogen. Hydrogen is not essential to the process, however, and reducing gases other than hydrogen can be used. For example, natural gas (methane) can be used as a reducing and fluidizing gas.

The hot, freshly reduced iron particles, obtained as described, are compacted while still hot so as to facilitate cohesion of the particles. Following compaction, the hot, freshly reduced iron is precooled in any convenient manner. For example, good results are obtained by immersion of the hot compacted iron in boiling water or by means of a water spray directed on the hot compacted iron. Precooling can be effected while the iron is in sheet form, but is preferably effected after the iron is broken into chips because of the greater cooling efficiency in the latter instance. The iron is cooled as described from the reduction temperature to a temperature in the range of about 210° to 400° F. The latter temperature is advantageously not more than about 50° in excess of the temperature at which the stabilizing bath is to be maintained, as substantially higher precooling temperatures tend to create a heat dissipation problem. The precooling temperature need not be higher than the temperature of the mineral oil stabilizing bath but can be the same as or lower than that of the stabilizing bath.

Following precooling of the iron to a temperature in the range of about 210° to 400° F., the iron is immersed directly in the stabilizing oil bath which, as stated above, is maintained at a temperature not more than about 400° F., preferably 250° to 350° F., but sufficient to reduce the surface tension of the oil to a figure not greater than about 34 dynes per centimeter, preferably in the range of about 23 to 30 dynes per centimeter. It will be understood that the specific maximum permissible surface tension may vary slightly according to the specific oil employed. Accordingly, the temperature of the oil bath should not only not exceed 34 dynes per centimeter, but also should be sufficiently low that 250 grams of the thus-stabilized iron in boiling water will not liberate more than 0.5 milliliter of hydrogen gas per second.

In order to demonstrate the effectiveness of the process of this invention in stabilizing reduced iron, freshly reduced, hot compacted iron chips that had been precooled and stabilized as disclosed herein were tested for stability. According to the procedure followed, reduced iron chips were activated by heating in an electric furnace maintained at 900° F. in an atmosphere of hydrogen. After the chips had been in the furnace for about 45 minutes under these conditions, they were removed and precooled to a temperature of approximately 300° F. by immersion in boiling water, then removed and immersed in a stabilized oil bath maintained at a temperature of 250° F. The storage stability of the stabilized iron chips was tested by charging 250 grams of the chips and 400 ml. of water to a wide-mouthed Erlenmeyer 1000 ml. flask to which there had been attached a reflux condenser and an inverted burette adapted to collect gas over water. The water in the flask was then heated to boiling. After the chips had been boiled about 10 minutes, the hydrogen evolution rate was determined by collecting the gas over water in the inverted burette. Heating was continued until a maximum rate of gas evolution, varying in accordance with the degree of the stabilization of the chips, was reached. The hydrogen evolution rate was recorded as milliliters of hydrogen per second. Two hundred and fifty grams of unstabilized chips on standing in boiling water will evolve a minimum of 4 ml. of hydrogen per second. A hydrogen evolution rate of 0.5 ml. per second is regarded as the maximum that can be tolerated in stable reduced iron chips since chips having a hydrogen evolution rate of greater than 0.5 ml. per second will show a marked temperature rise during storage in contact with the atmosphere. Preferably, stabilized reduced iron chips should exhibit a hydrogen evolution rate not greater than about 0.3 ml. per second.

The oil used in the test was a light lubricating distillate having an initial boiling point of 561° F. at a pressure of 760 mm. Hg, derived from a Coastal type (Texas) crude petroleum oil. A typical sample of the oil had a viscosity of 2.4 Saybolt Universal seconds at 250° F., a viscosity-gravity constant of 0.871, an API gravity of 24.5, an open-cup flash point of 355° F., a sulfur content of 0.13 percent and a surface tension of 25.4 dynes per centimeter at 250° F., and about 34.5 dynes per centimeter at 80° F. This oil is referred to hereinafter as test oil I.

The results of the test described above are presented in Table A below. In order to demonstrate the nature of the problem with which the present invention is concerned, there are also included in Table A the results obtained when the iron chips were directly immersed in a low-temperature stabilizing bath of test oil I without precooling, and the results obtained when the iron chips were immersed, after precooling, in a low-temperature bath of test oil I.

Table A

| | Hydrogen evolution rate, ml./sec. |
|---|---|
| Iron chips stabilized by precooling to 300° F. in boiling water and immersion in test oil I at 250° F. initial temperature (max. <300° F.) | 0.09 |
| Iron chips stabilized by direct immersion in test oil I at 80° F. initial temperature (max. <150° F.) | 0.13–0.08 |
| Iron chips stabilized by precooling to 300° F. in boiling water and immersion in test oil I at 80° F. initial temperature (max. <150° F.) | 2.3 |

The foregoing data demonstrate that test oil I was satisfactory as a stabilizing oil for precooled iron chips when the initial temperature of the stabilizing oil was 250° F., at which temperature test oil I had a surface tension of 25.4 dynes per centimeter.

From the foregoing data it also can be seen that test oil I having an initial temperature of 80° F. was entirely satisfactory for stabilizing the iron chips by direct immersion therein, notwithstanding that the surface tension of test oil I at 80° F. was above 34 dynes per centimeter. However, the same oil was unsatisfactory under the same conditions for stabilizing iron chips that had been precooled to 300° F. in boiling water.

In Table B below there are shown results obtained with other suitable oils of the kind disclosed herein. In Table B, test oil II was a low-temperature black oil and test oil III was an asphaltum oil. Test oil IV was a furfural extract obtained from a Coastal lubricating distillate having the characteristics of test oil I. Test oil V was a reduced crude oil obtained as the residue from the distillation at substantially atmospheric pressure of a Middle Eastern crude oil. Test oil VI was a reduced crude oil obtained as the distillation bottoms from the vacuum distillation of Venezuela crude oil. Test oil VII was the residue obtained from the distillation at reduced pressure of a mixture of West Texas Coastal crude oil and South Louisiana crude oil. Each of the test oils had initial boiling points above 550° F. at atmospheric pressure.

Table B

| Test oil | II | III | IV | V | VI | VII |
|---|---|---|---|---|---|---|
| Description: | | | | | | |
| Viscosity, SUV, sec.: | | | | | | |
| 100° F | | | 249 | | | |
| 210° F | 59 | 118 | 42.2 | 270.5 | 7,143 | 8,400 |
| 250° F | 92 | 470 | 80 | 135 | 1,950 | 1,950 |
| | | | 345 | 400 | 620 | 655 |
| Flash point, TOC, °F | 395 | 575 | 345 | 400 | 620 | 655 |
| Sulfur, B, percent | 0.25 | 0.42 | 0.45 | 4.32 | 2.12 | 4.30 |
| Viscosity–gravity constant | 0.890 | 0.907 | 0.943 | 0.902 | 0.907 | 0.913 |
| Gravity, °API | 20 | 15 | 13.6 | 13.9 | 8.7 | 7.8 |
| Surface tension, dynes/cen.: | | | | | | |
| 250° F | 26.5 | 29.4 | 28.0 | 29.6 | 33.7 | 34.1 |
| 350° F | | 25.4 | 23.3 | 26.3 | 28.6 | 33.0 |
| Inspection: | | | | | | |
| Hydrogen evolution rate, water quench at 212° F., oil immersed, ml./sec.: | | | | | | |
| 250° F | ¹0.04 | 0.44 | 0.04 | 0.28 | 0.20 | 0.82 |
| 350° F | | 0.11 | | | 0.08 | 0.11 |

¹ Avg. 2 runs.

The results set forth in the preceding table in connection with test oils I to VI indicate that freshly reduced, compacted iron is stabilized by immersion in an oil bath that is at a temperature below 400° F. and such as to reduce the surface tension of the oil below 34 dynes per centimeter. The results obtained with test oil VI indicate the criticality of the surface tension limit.

According to a typical embodiment, fresh hydrogen gas obtained from a hydrogen generator is combined with recycled hydrogen from a reducing reactor and compressed to a pressure such that when heated in indirect heat exchange with the hot recycled hydrogen and then to reactor temperature in a furnace, the fresh and recycled hydrogen mixture will be at a pressure of 400 p. s. i. g. Heating of the hydrogen in the furnace is carried out to elevate the temperature of the reduction gas to 900° F. Hot compressed hydrogen at 900° F. and 400 p. s. i. g. is then introduced into the bottom of a reaction vessel that contains a fluidized mix of finely divided iron and iron oxide particles, principally particles that will pass a 50 mesh screen and be retained on a 500 mesh screen (U. S. Sieve Series). Fluidization is maintained by an upflowing stream of the hot hydrogen gas. Fresh or unreduced iron ore fines are predried and introduced into the reduction zone at the top of the reaction vessel. Reduction of iron ore fines to reduced iron takes place in the reaction vessel, wherein the temperature and pressure are maintained respectively at 900° F. and 400 p. s. i. g. A stream of hydrogen gas containing entrained, hot, reduced iron particles is withdrawn at the top of the reactor. Hot, wet hydrogen freed of iron particles is passed in indirect heat exchange with the mixture of fresh and recycled hydrogen, and the thus-cooled wet hydrogen is then freed of moisture in the drying tower and returned to the compressor. Hot, freshly reduced iron particles freed from hydrogen are collected and compacted into sheets by passage between compacting rolls. The resultant sheets are then passed between breaker rolls to form iron chips. The hot, reduced iron chips are precooled to about 300° F. by brief immersion in boiling water and after removal from the precooling bath the chips are stabilized by immersion in test oil III maintained at a temperature of about 300° F. In another case the precooled iron chips are stabilized by immersion in a bath of test oil I maintained at a temperature of 250° F. In both instances reduced iron of good stability is obtained.

Obviously, many modifications and variations of the invention as described herein may be resorted to without departing from the spirit or scope thereof, and accordingly, only such limitations should be imposed as are indicated in the claims appended hereto.

I claim:

1. The process of stabilizing metallic iron produced by direct reduction of iron ore with a reducing gas at an elevated pressure and an elevated temperature below the fusion temperature of said ore comprising precooling the hot, freshly reduced metallic iron to a temperature in the range of about 210° to 400° F., and then immersing the precooled metallic iron in a stabilizing bath of a relatively high boiling mineral oil at a temperature not greater than about 400° F. but sufficient to reduce the surface tension of the oil to a value not exceeding 34 dynes per centimeter and such that 250 grams of the thus-stabilized iron in boiling water will not liberate more than 0.5 milliliter of hydrogen per second.

2. The process of claim 1 wherein the temperature of the stabilizing bath is in the range of about 250° to 400° F. and the mineral oil has an initial boiling point above about 550° F., a viscosity-gravity constant in the range of about 0.865 to 0.945, a viscosity in the range of about 1.90 to 2000 Saybolt Universal seconds at a temperature of 250° F., an API gravity in the range of about 7.5 to 25°, and a surface tension in the range of about 23 to 34 dynes per centimeter at the temperature of the stabilizing bath.

3. The process of claim 1 wherein the temperature of the stabilizing bath is in the range of about 250° to 350° F., the mineral oil has a flash point above the temperature of the stabilizing bath, a sulfur content in the range of 0 percent to 3 percent, a viscosity-gravity constant in the range of about 0.865 to 0.910, a viscosity in the range of about 10 to 450 Saybolt Universal seconds at a temperature of 250° F., an API gravity in the range of about 15° to 25°, and a surface tension in the range of about 23 to 30 dynes per centimeter at the temperature of the stabilizing bath.

4. The process of claim 1 wherein the mineral oil is a lubricating oil distillate.

5. The process of claim 1 wherein the mineral oil is a black oil.

6. The process of claim 1 wherein the mineral oil is a residual oil obtained from the distillation of a crude petroleum oil at approximately atmospheric pressure.

7. The process of claim 1 wherein the mineral oil is a residual oil obtained by vacuum distillation of a crude petroleum oil.

8. A process comprising reducing finely divided iron ore particles in fluidized form with an excess of hydrogen at a temperature below the fusion point of the ore and in the range of about 800° to 1700° F. and at a hydrogen pressure in the range of about 50 to 500 p. s. i., compacting the hot, freshly reduced finely divided metallic iron particles into a coherent structure, cooling the hot, freshly reduced, compacted iron by direct contact with water to a temperature in the range of about 210° to 400° F., then stabilizing the cooled, compacted, freshly reduced metallic iron by immersion in a stabilizing bath of a mineral oil that has an initial boiling point above about 550° F. at atmospheric pressure, and that is at a temperature in the range of about 250° to 400° F. and not more than about 50° below that of the cooled iron, but sufficient to reduce the surface tension of the oil to a value in the range of about 23 to 34 dynes per centimeter, and such that 250 grams of the thus-stabilized iron in boiling water will not liberate more than 0.5 milliliter of hydrogen per second.

No references cited.